INVENTOR.
OTTO G. SCHEUERMANN

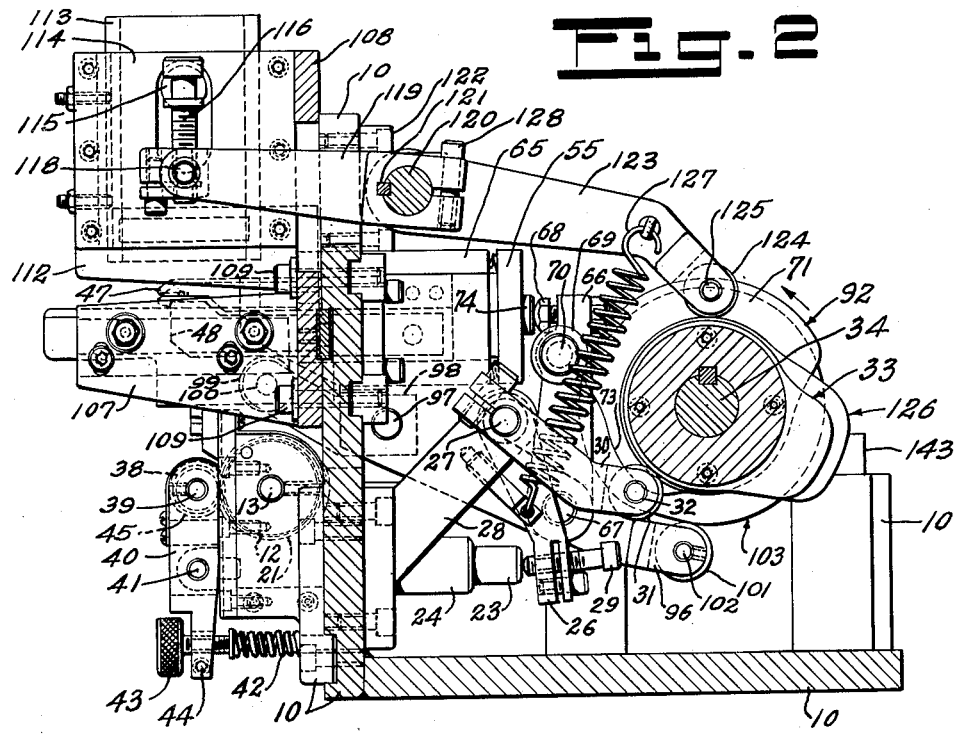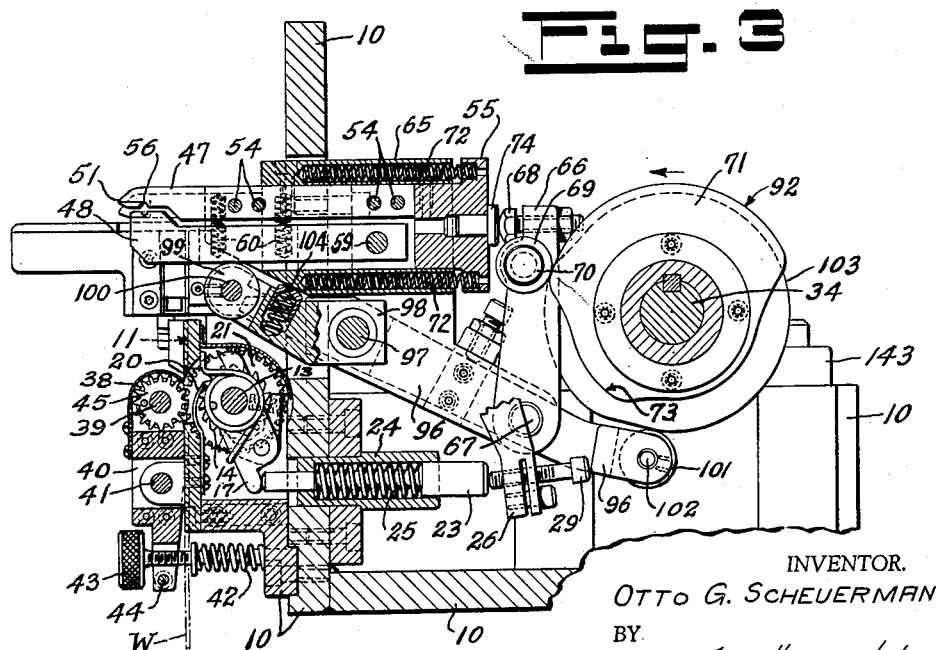

ATTORNEYS

June 27, 1961 O. G. SCHEUERMANN 2,989,751
TOP STOP AND TAPE CUTTING MACHINE FOR SLIDE FASTENER
Filed Aug. 6, 1958 4 Sheets-Sheet 4
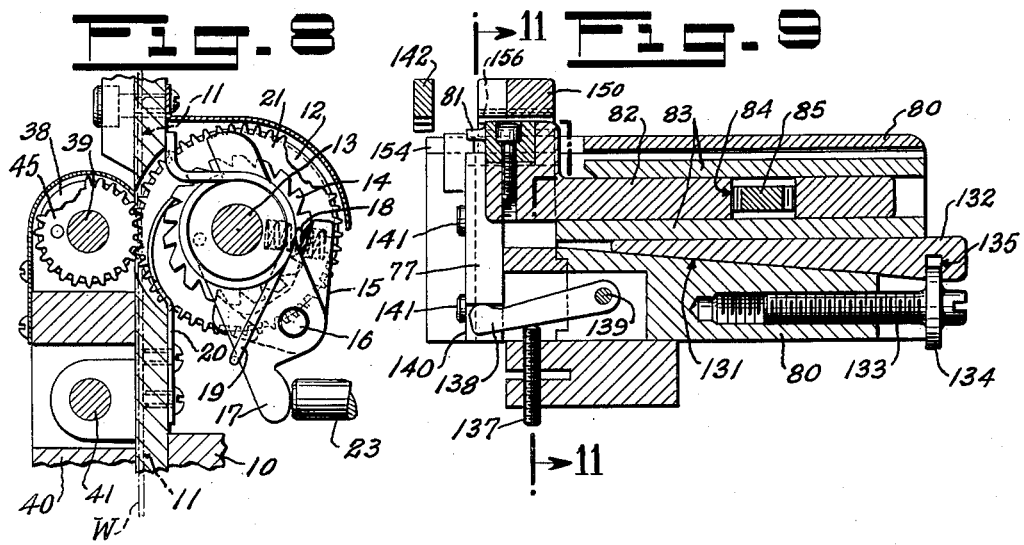
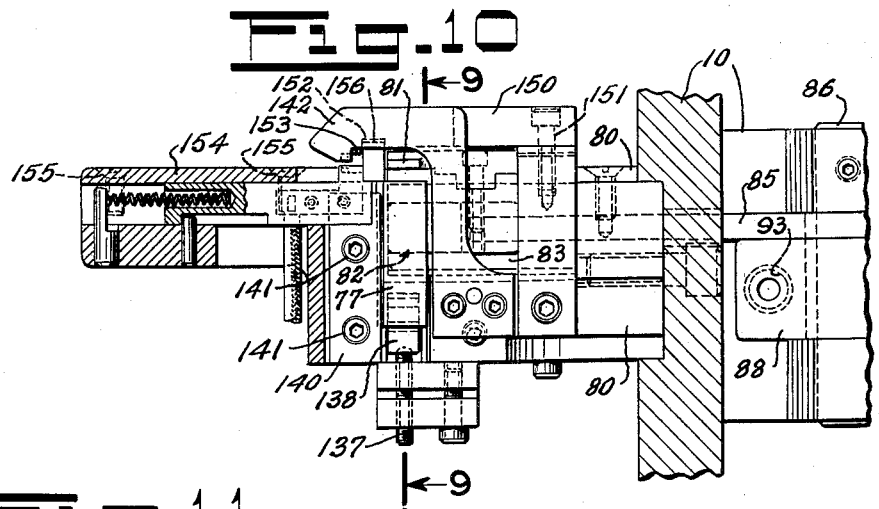
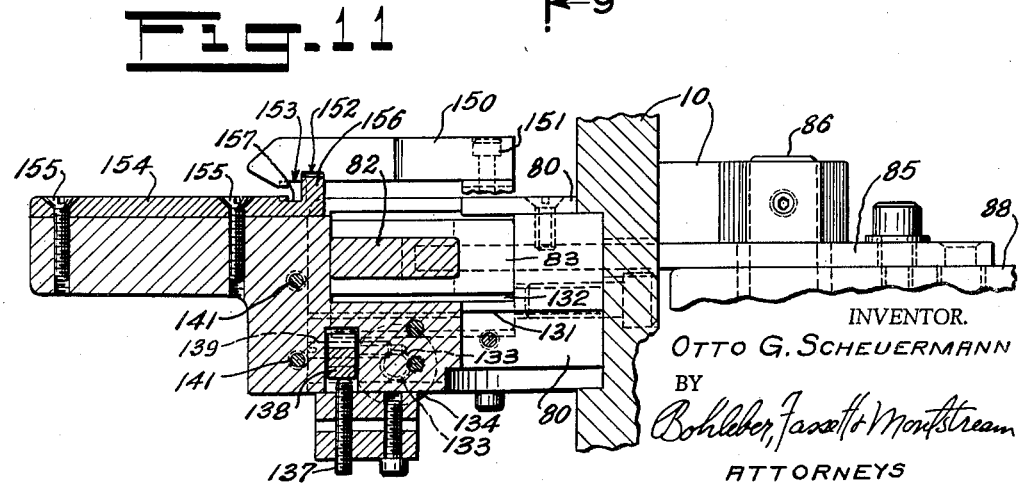
INVENTOR.
OTTO G. SCHEUERMANN
BY
Bohleber, Jaxalt + Montstream
ATTORNEYS

# United States Patent Office 2,989,751
Patented June 27, 1961

2,989,751
TOP STOP AND TAPE CUTTING MACHINE FOR SLIDE FASTENER
Otto G. Scheuermann, Westfield, N.J., assignor to General Zipper Corporation, Long Island City, N.Y., a corporation of New York
Filed Aug. 6, 1958, Ser. No. 753,578
16 Claims. (Cl. 1—120)

The invention relates to a machine for applying a top stop to a slide fastener. The invention also relates to a combination in a machine for applying a top stop to a slide fastener and for cutting the continuous tape. In the manufacture of a slide fastener, the tape is manufactured in long lengths of two ribbons with intermeshing scoops along each ribbon edge. A series of scoops are cut out at spaced intervals along the tape at the desired length of the finished slide fastener. A bottom stop is applied at one end of the gap formed by the cut out scoops or over the scoops at the bottom of the two ribbons, which are to form a slide fastener, to retain the bottom of the ribbons and bottom scoops against separation. A slider is inserted on the scoops. Thereafter a top stop is applied at the inner or scoop edge of at least one ribbon so that when the slider moves along the scoops to close or intermesh the scoops, the slider will not run off of the top end of the scoops. The machine severs the tape or ribbons between the ends of the gap formed by the cut out scoops thereby separating the slide fastener from the tape after the top stop has been applied. This essentially completes the manufacture of the slide fastener.

It is an object of the invention to construct an improved top stop machine for slide fasteners for applying a top stop at the end of a line of scoops on the scoop edge of at least one ribbon.

Another object of the invention is to construct an improved machine for applying a top stop at the end of the scoops on a ribbon of a tape in which the top stop is formed in the machine from wire bent into an open U-shaped form and thereafter is clamped or squeezed onto the inner or scoop edge of one of the ribbons of the tape.

Another object is to construct an improved means for shaping a top stop from a wire.

A still further object is to construct a combination of a top stop machine for applying the top stop to the edge of a ribbon of the slide fastener tape and to automatically sever or cut the tape between the ends of the scoop gap in the tape.

Figure 1:
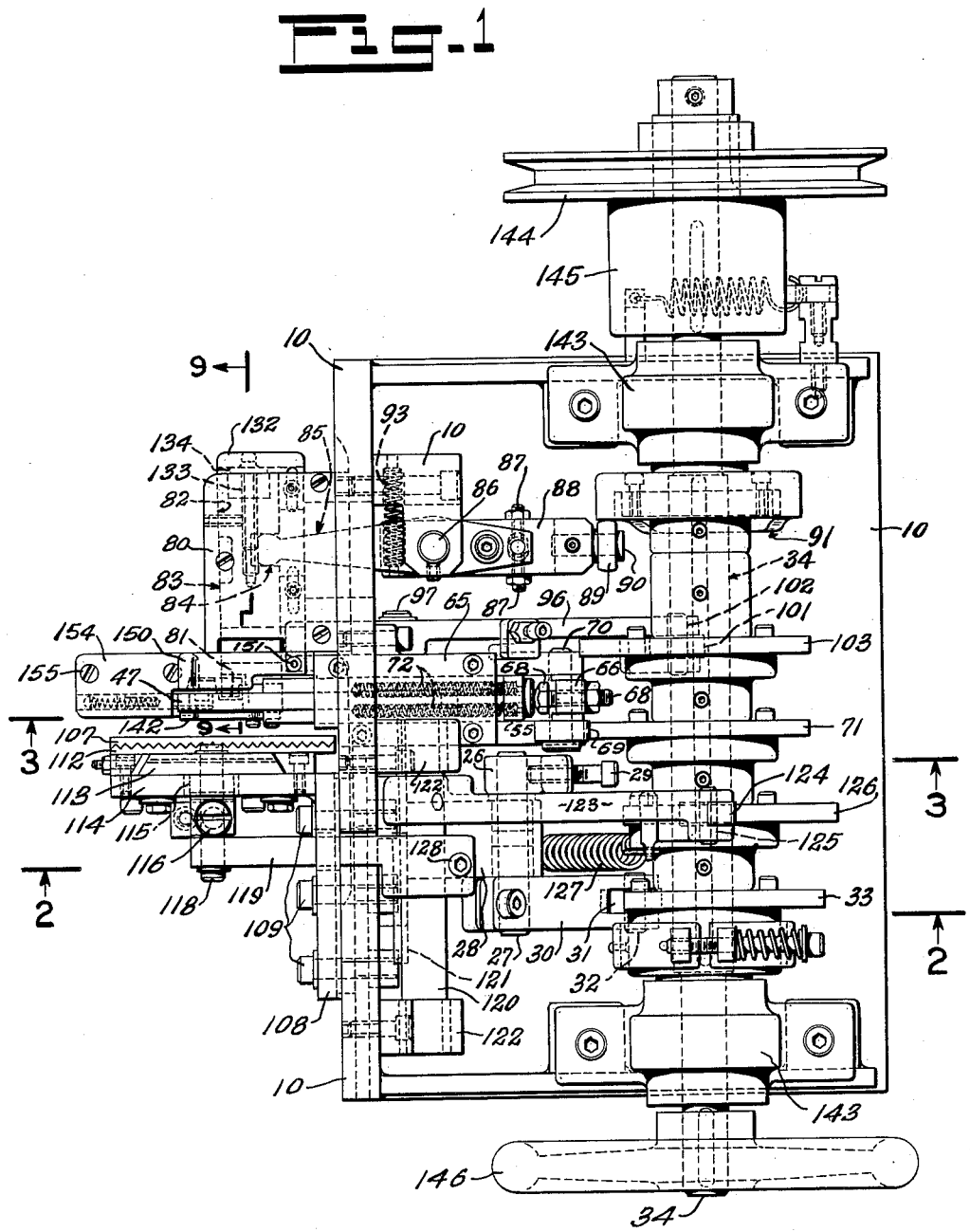
Figure 4:
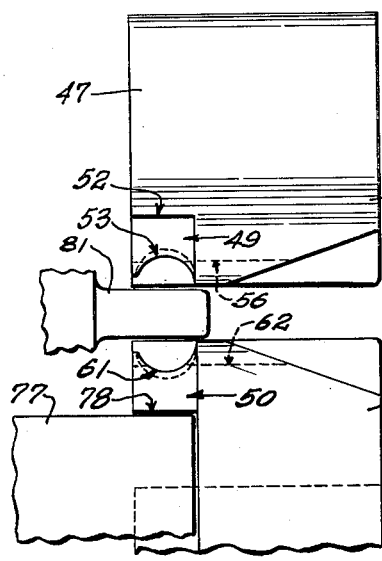
Figure 5:
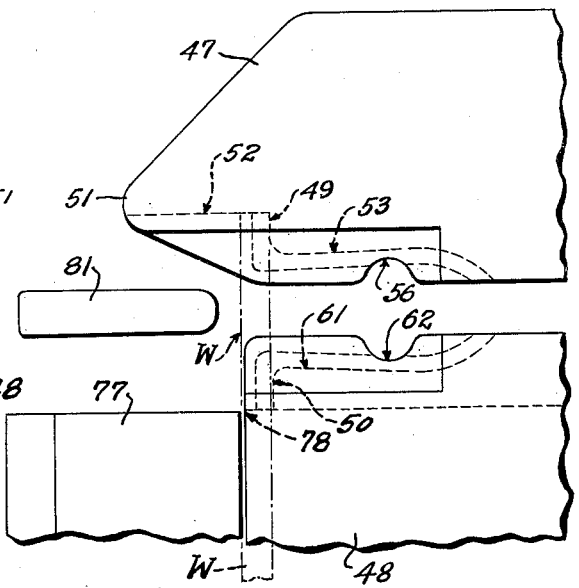
Figure 7:
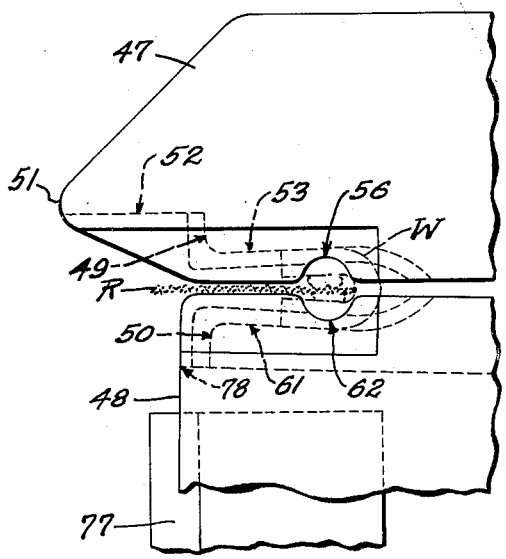
Figure 6:
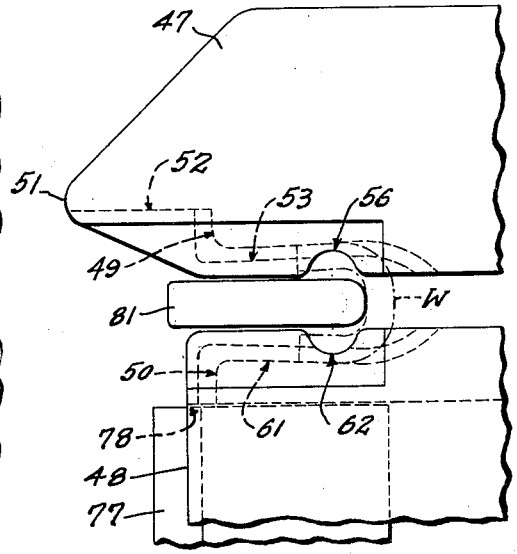

Other objects of the invention will be more apparent from the following description when taken in connection with the accompanying drawings illustrating a preferred embodiment thereof in which:

FIG. 1 is a top view of the machine;
FIG. 2 is an end view and partial section taken on line 2—2 of FIG. 1;
FIG. 3 is a section taken on line 3—3 of FIG. 1 showing details of the jaws and the wire feed means;
FIG. 4 is an enlarged front view of the jaws;
FIG. 5 is an enlarged side view of the jaws and a wire in dot dash lines being presented to the jaws in position prior to forming the top stop;
FIG. 6 is an enlarged view of the top stop being bent into U-shaped form;
FIG. 7 is an enlarged view of the jaws with the top stop clamped on the edge of a ribbon;
FIG. 8 is a view of the wire feed means;
FIG. 9 is a section through the anvil slide taken on line 9—9 of FIG. 1; and
FIG. 10 is a side view of wire cutter and anvil.
FIG. 11 is a detail view of a scoop guide.

The machine uses a pair of jaws to apply a U-shaped top stop to an edge of the ribbon of the slide fastener tape as will appear. Mechanism supplies the U-shaped top stop between the jaws which advance the top stop onto the ribbon edge and clamps the stop thereon. The top stop machine particularly illustrated also forms its top stop in the machine from a wire. A frame 10 of suitable form is provided. A continuous wire W is fed to the top stop forming mechanism from a supply spool (not shown), the wire being fed upwardly in an enclosed wire groove or channel 11 in the frame of the machine and along a wire cutter as will appear. The wire usually used is flat on one side and rounded on the other.

The wire feed means includes a wire feed roll 12 which is intermittently rotated in properly timed sequence. This feed roll is fixed upon a roll shaft 13 carried by the frame. The feed roll is turned intermittently by a ratchet wheel means including a ratchet wheel 14 fixed on the shaft 13 and a pawl 15 which is mounted on a pivot 16 carried by a pawl arm 17. The pawl engages the ratchet wheel. The pawl arm is freely mounted on the wire feed roll shaft 13 to oscillate thereon. A pawl spring 18 presses the pawl into contact with the ratchet wheel. A return spring 19 restores the pawl arm and pawl to initial position. A holding pawl 20 engages the ratchet wheel 14 and prevents reverse rotation of the latter and the feed roll.

The pawl arm and the pawl are oscillated by a push pin 23 slidably mounted in a guide 24 carried by the frame and a spring 25 around the pin presses the push pin to the right as viewed in FIG. 3. An operating arm 26 is mounted on a pivot 27 carried by the frame such as on an ear 28. This operating arm has a screw 29 therein which engages the end of the push pin so that adjustment of the screw adjusts the timing of the operation of and the throw of the push pin. On this same pivot 27, a cam lever 30 is secured having a cam follower or roller 31 rotatably mounted on a pin 32 carried by the lever. This cam follower engages a cam 33 secured to a main shaft 34 of the machine which shaft is suitably mounted for rotation in the frame. The push pin spring 25 also propels the arm 26 and the operating lever counterclockwise as viewed in FIG. 3 and retains the cam follower in contact with its cam.

In order to feed the wire, a pressure roll 38 engages the wire and presses it against the feed roll 21. This pressure roll is rotatably mounted upon a pin 39 carried by a pressure roll arm 40 which is pivotally mounted on the frame on a pivot 41. A spring 42 engages an adjusting screw 43 carried by this pressure roll arm to press the wire against the periphery of the feed roll or to grip the wire between the pressure roll and feed roll. By adjusting the adjusting screw, the pressure of the spring and hence of the pressure roll on the wire may be adjusted at will. A lock screw 44 locks the adjusting screw in adjusted position.

The wire is fed through the wire track or groove 11 carried by the frame to a pair of jaws 47 and 48. One jaw is fixed and the other jaw is movable with respect to the fixed jaw. Each jaw may have a vertical wire groove 49 and 50 in its end face. In the construction particularly illustrated the upper jaw 47 is fixed and has a projecting nose 51 having a horizontal surface 52 which forms a stop for the feeding of the wire. The end of the wire abuts the stop when the proper length has been fed. The fixed jaw has a clamping face on the lower edge thereof and in this clamping face is a wire groove 53 preferably adjacent an edge of the face. The fixed jaw is secured by bolts 54 to a jaw slide 55 as will be described in greater detail hereinafter. A clearance groove 56 may be provided laterally of the clamping face for the scoops in the tape.

The other or movable jaw 48 is shown particularly as being mounted for pivotal movement on a pivot 59 carried by the jaw slide 55. Spring means 60 carried in holes in the jaws presses the movable jaw away from the fixed jaw. This movable jaw preferably has a wire groove 50 in the end face thereof which is in alignment with the wire track 11 in the frame in the initial position of this jaw. This movable jaw also has a clamping face at an edge thereof so that the clamping face of the fixed jaw and the clamping face of the movable jaw are opposite each other. The clamping face of the movable jaw has a wire groove 61 therein in alignment with the wire groove in the clamping face of the fixed jaw. The two clamping faces are spaced from each other a distance to receive an anvil therebetween and an open top stop between the grooves 53 and 61. The jaw 48 will also have a laterally extending scoop clearance groove 62.

Operating means are provided to move or advance the jaw slide 55 and the jaws carried thereby forwardly, or to the left as viewed in FIG. 3. The jaw slide is, therefore, mounted in a suitable guide 65 carried by the frame. A slide operating arm 66 is mounted on a pivot 67 carried by the frame or particularly the guide 65 and an adjusting screw 68 carried on the arm engages the end of the jaw slide or particularly a wear button 74 thereon to propel the same forwardly or to the left. The operating arm carries a cam follower or roller 69 rotatably mounted on a pin 70 carried by the arm and the cam follower engages a cam 71 secured to the main shaft 34 of the machine. Spring means 72 carried in holes in the guide 65 and engaging the slide 55 normally propels the slide and the operating arm to the right and maintains the cam follower 69 in contact with its cam 71. The cam 71 has an intermediate land 73 to advance the jaw slide and jaws part way as will be described.

Means are provided to cut off the wire at the proper length so that a length of wire is on each side of the space between the jaws. This wire cutting means includes a fixed cutter 77, the corner of which forms a cutting edge and the other cutter is the edge or corner 78 of the pivoted jaw (FIG. 5). When the pivoted jaw is moved forwardly the wire is sheared or cut off beween the two cutting edges.

The cut off length of wire is shaped during the initial forward movement of the two jaws. This is accomplished by an anvil 81 which is located approximately at the forward edge of the wire and having a width to pass between the space between the two spaced jaws. As the two jaws move forwardly or to the left, as viewed in FIGS. 5–7, the center of the wire is held stationary by the anvil and the ends of the wire are bent around the anvil by the forward moving jaws. The wire is bent into U-shaped form into the wire grooves 53 and 61 in each clamping face in each jaw. When bent the wire W has an open U-shaped form and is retained between the grooves 53, 61 after removal of the anvil.

The anvil 81 is mounted for lateral movement with respect to the jaws in any manner so that after the wire has been bent into its U-shaped form the anvil is withdrawn laterally. To this end, the anvil is shown as carried by an anvil slide 82 slidably mounted in a U-shaped guide 83 carried by a slide frame 80 secured to the frame 10. Lateral movement is secured by providing a slot or pocket 84 in the slide and the end of a slide lever 85 is received in the slot. The slide lever is pivotally mounted on a pivot 86 carried by the frame. The other end of this lever is received between two adjusting screws 87 carried by an extension 88 forming a part of the lever which is also pivotally mounted on the pivot. The adjusting screws enable the position of the anvil slide and the anvil to be adjusted in a lateral direction with respect to the jaws. The end of the extension carries a cam follower or roller 89 rotatably mounted on a pin 90 and the cam roller engages a face cam 91 secured to the main shaft 34 of the machine.

The cam is timed to withdraw the anvil laterally from between the jaws when the top stop has been shaped into U-shaped form between the two jaws and to hold the anvil out of the path of the jaws until the jaws return to their initial position. Upon lateral removal of the anvil the U-shaped top stop is retained in the wire grooves of clamping faces of the two jaws by resilient or frictional contact. The jaw advancing cam 71 has an intermediate land 73 which keeps the jaws stationary during the lateral withdrawal of the anvil and thereafter this cam again advances the forwardly jaws to project the U-shaped top stop with the edge of a ribbon of the tape within the U of the top stop. The cam 71 has a second dwell or land 92 so that the jaws remain in advanced position for a time interval to clamp the top stop on the tape.

In this advanced position of the jaws, means are provided to move the movable or pivoted jaw 48 towards the fixed jaw 47 to close and clamp the top stop on the edge of the ribbon. This movement of the pivoted jaw is secured by a clamping means including a clamping lever 96 secured to a pivot 97 mounted in the frame. This pivot has an arm 98 secured thereto and the arm carries a roller 99 on the end thereof on a pin 100. The arm 96 carries a cam follower 101 rotatably mounted on a pin 102. The cam follower is engaged by a cam 103 secured to the main shaft 34. When the jaws have reached their advanced forward position with the U-shaped top stop having an edge of a ribbon of the tape therebetween (FIG. 7), the cam operates the clamping means to press the roller 99 upwardly against the bottom of the pivoted jaw 48 and pivots the pivoted jaw towards the fixed jaw 47 which closes and clamps the top stop onto the edge of the ribbon R. The arm carries a spring pressed cap 104 engaging the jaw slide guide 65 which normally keeps the clamping lever and roller 99 in its down position. This spring pressed cap also keeps the cam follower 101 against its cam 103. After the top stop has been clamped on the edge of the ribbon of the tape, the cam follower 101 rides off its high point of the cam 103 and the pressing roller 99 moves downwardly so that the spring means 60 between the two jaws presses the movable jaw downwardly to release the top stop. Thereafter cam follower 69 rides off of the land 92 and the springs 72 press the jaw slide 55 and the jaws to the right as viewed in FIG. 3 and the jaws are ready to repeat their operation.

Means are provided to automatically sever or cut the tape. This means includes a fixed blade 107 carried by a bracket 108 which is adjustably mounted on the frame 10. The bracket is secured to the frame in adjusted position by suitable bolts 109. A movable blade 112 is carried by the blade slide 113 which is slidable vertically in a guide 114. The slide carries a pivot 115 which receives a connecting link 116 preferably in the form of a screw for adjustment of the position of the movable blade.

Means are provided to move the movable blade which includes a blade lever 119 having a pivot 118 which receives the connecting link or screw 116. The blade lever is non-rotatably mounted on a pivot shaft 120 by a key 121 so that the lever may be slid along the shaft. The shaft is pivotally mounted in bearings 122 carried by the frame 10. The pivot shaft 120 has a lever 123 secured thereto and this lever carries a cam follower or roller 124 rotatably mounted on a pin 125 which roller engages a cam 126. This cam is secured to the main shaft 34. A spring 127 having one end secured to the lever 123 and the other end anchored to the frame keeps the movable blade in its up or open position and the cam roller 124 in contact with its cam 126.

By adjusting the bracket 108 on the frame 10, the location of the blades 107 and 112 with respect to the jaws may be varied at will. In this adjustment the blade lever 119 is slidable along the pivot shaft 120 so that an operating connection is established between the cam 126 and the movable blade irrespective of the position of the blades. A set screw 128 may secure the lever to the shaft 120 in adjusted position. For example, a slide fastener may be desired having ribbon ends an inch and a half long in which case the scoop gap would be three inches long. The position of the blades are then adjusted to cut the tape midway in the gap or midway between the ends of the line of scoops. It is clear that the blades may be adjusted to cut the tape at any point between the ends of the scoop gap if that should be desired.

Means are provided to adjust the position of the anvil slide 82. To accomplish this the anvil guide frame 80 has a taper surface 131 against which is received a wedge 132. A screw 133 is threaded into the guide frame which screw carries a head 134 engaging in a slot 135 in the wedge 132. By turning the screw the wedge may be moved inwardly or outwardly to adjust the vertical position of the anvil guide 83 and slide 82.

There is also shown in FIG. 9 an adjustment for the elevation of the wire cutter 77. This includes an arm 138 engaging the bottom of the wire cutter 77 and pivoted on a pivot 139. An adjusting screw 140 engages the arm for adjustment of the position of the top surface or cutting edge of the wire cutter. The wire cutter is clamped in position on the anvil frame by a lock bar 140 having bolts 141. The wire W is fed along the inner face of the wire cutter. The anvil guide frame 80 may also carry a cord stop and ribbon supporting means or hold-up plate 142 adjacent to the jaws between the latter and the tape cutter and projecting outwardly to or approximately to the forward position of the jaws to locate the inner ribbon of the tape above the outer ribbon for application of the top stop. The inner ribbon will project over the fixed jaw 47 when the top stop is applied.

The main shaft 34 is mounted in bearings 143 carried by the frame 10. The shaft is driven from a pulley 144 connected to a belt through a suitable motor. The mechanism is controlled by a clutch 145 of known construction which may be released by a foot pedal or by a solenoid operated from a foot switch. A hand wheel 146 is carried on the opposite end of the main shaft 34.

In order to guide a tape to which a top stop is to be applied, a tape or scoop guide is shown in detail in FIGURE 11. An upper scoop guide 150 is secured to the anvil slide frame 80 by a bolt 151 and carries a groove 152 on its lower face adjacent a scoop groove 153. A lower scoop guide 154 is secured in place by screws 155 and carries an upward aligning tongue 156 which is received in groove 152. The lower guide has a scoop groove 157. The scoop guides 150 and 153 are fixed in position and retains the tape to which the top stop is to be affixed in alignment with the end of the forward movement of the jaw means.

The machine described applies a top stop at the end of the scoops on one ribbon of a slide fastener tape in which the scoops of the two ribbons are intermeshed and there is a gap between successive lines of intermeshed scoops. A continuous tape of such slide fasteners is mounted on a storage roll (not shown) and an operator takes the outer ribbon and inserts it at a scoop gap in the guide channels 153, 157, FIG. 11, with the inner ribbon passing over the hold up plate 142. The machine is then operated by depressing the switch whereupon the cam shaft 134 is rotated. The wire feed cam 33, FIG. 2, pivots the levers 26 and 30 which presses the pin 23 to the left and rotates the wire feed roll 12 so that a wire W is fed into engagement with the stop 52 of the jaw 47, FIG. 5. The feed roll is retained in the advanced position for the period of the high level dwell of the cam 33 in order to assure no movement of the wire. After passing over the dwell, the feed pawl 15 rides over the teeth of the ratchet wheel 14 in a counterclockwise direction so that the feed mechanism is ready for the feeding of a second length of wire to the jaws.

The anvil 81 is in front of the wire and in front of the space between the jaws 47 and 48 as shown in FIGS. 4 and 5. The cam shaft rotates to bring the lower land 73 into contact with roller 69 so that the two jaws are moved initially or a first step forwardly or to the position shown in FIG. 6 which first cuts the wire between 77 and 78, then bends the cut off portion of the wire around the anvil 81 into a U-shaped form staple in the grooves 53, 61. The U-shaped wire or staple is retained in these grooves between the jaws by its natural resiliency. During the period that the land 73 is contacting the roller 69, the cam 91 engages the roller 89 to pivot lever 85, 88 which moves the slide 82 laterally to withdraw the anvil 81 from between the jaws and from between the legs of the U-shaped staple. The grooves 53 and 61 retain the staple in position during this lateral withdrawal of the anvil.

With the anvil withdrawn, the higher land 92 of the cam then comes into engagement with the roller 69 and the jaws are advanced for the second step over the adjacent or inner edge of one ribbon of the tape to the position shown in FIG. 7. The ribbon on the side towards the cam shaft has been laid above the jaw 47 so that it is out of the way and presents the inner edge or scoop edge of the other ribbon to the U-shaped wire clip or staple. The jaws remain in this position during the period of the land 92. With the jaws in advanced position, the cam 103 presses the roller 101 downwardly as well as its lever 96 which pushes the other end of this lever and its roller 99 upwardly so that the lower jaw 48 pivots upwardly on its pivot 59 to close the open U-shaped staple onto the edge of the ribbon to form the top stop and then the lever 96 and roller 99 is dropped before the jaw move rearwardly. In the forward movement of the jaws the pivoted jaw 48 rides on the roller 99. When the roller 69 rides off of the land 92, the springs 72 retract the jaws to the right as shown in FIG. 3.

The knife or shear is operated by the cam 126 engaging the roller 124 to raise it and its lever 123. The other end of this lever descends and being connected with the movable blade 112 of the knife, the blade descends and cuts the preceding slide fastener from the continuous ribbon at the adjusted position which usually will be at the mid point of the scoop gap in this slide fastener. The machine is then ready for a second operation. In this connection it is immaterial whether the wire is fed at the beginning of the sequence of operation or if it is at the end. In either event a wire would be in position for the succeeding steps described.

The invention is presented to fill a need for improvements in a Top Stop Applying Machine. It is considered that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A top stop machine for slide fasteners comprising a frame, a scoop guide carried by the frame, jaw slide means, mounting means slidably mounting the jaw slide means on the frame, a fixed jaw carried by the jaw slide means having a clamping face, a pivoted jaw pivotally mounted on the jaw slide means adjacent the fixed jaw and spaced therefrom and having a clamping face, the clamping faces being adjacent and opposite each other, wire grooves in the clamping faces, means to move the jaw slide means and the jaws forwardly and rearwardly, means to pivot the pivoted jaw at the end of its forward movement towards and away from the fixed jaw, mechanism on one side of the jaws and providing a U-shaped top stop in the wire grooves and between the jaws, tape cutting means carried by the frame adjacent to the jaws and on the opposite side from the top stop mechanism including a movable blade, means connected with the movable blade to operate the same, inner ribbon supporting means carried by the frame adjacent to the jaws and between the jaws and the tape cutting means and projecting outwardly to the forward position of the jaws, and means adjustably mounting the tape cutting means on the frame for adjustment towards and away from the jaws.

2. A top stop machine as in claim 1 in which the adjustable means includes a fixed blade, a bracket carrying the fixed blade and adjustably mounted on the frame towards and away from the jaws, the movable blade being mounted on the bracket, an elongated pivot shaft mounted on the frame and extending parallel with the tape guide, and the means to operate the movable blade is adjustably mounted on the elongated pivot shaft.

3. A top stop machine as in claim 2 including a main shaft, a blade slide carrying the movable blade, a guide carried by the bracket and receiving the blade slide, and the means to operate the movable blade is a blade lever connected with the blade slide, an operating lever secured to the pivot shaft, and a cam secured to the main shaft and connected with the operating lever.

4. A top stop machine for applying a top stop to a slide fastener comprising a frame, jaw slide means, guide means slidably mounting the jaw slide means on the frame, a fixed jaw carried by the jaw slide means having a clamping face, a pivoted jaw pivotally mounted on the jaw slide means adjacent the fixed jaw and spaced therefrom and having a clamping face, the fixed jaw and the pivoted jaw being the sole jaws for forming, advancing and closing the top stop, the clamping faces being opposite each other and spaced apart a distance to receive a top stop therebetween, a wire groove in each clamping face, jaw operating means to move the jaw slide means and the jaws forwardly and dwell in forward position and then move rearwardly, means to pivot the pivoted jaw during the dwell at the end of the forward movement of the jaws towards and away from the fixed jaw, a wire feed means to feed wire to the jaws, means to cut the wire at the jaws, an anvil adjacent the end of the pivoted jaw and receivable between the spaced jaws to bend the wire upon forward movement of the jaws, means positioned on one side of the jaws and mounting the anvil for lateral movement from between the jaws, and operating means connected with the anvil to move the same laterally from between the jaws after initial movement of the latter and thereafter to return the anvil to initial position.

5. A top stop machine as in claim 4 including a main shaft rotatably mounted on the frame, and in which the jaw operating means includes a jaw slide lever engaging the jaw slide means, a jaw slide cam secured to the main shaft and connected with the jaw slide lever, clamping means pivoted on the frame and engaging the movable jaw to press the same towards the fixed jaw, and a cam secured to the main shaft and connected with the clamping means.

6. A top stop machine as in claim 5 in which the jaw slide cam has an intermediate land and a second land of different elevation and spaced peripherially, the anvil operating means being operable during the engagement of the jaw slide lever with the intermediate land, and the clamping means being operable during engagement of the jaw slide lever with the second land.

7. A top stop machine as in claim 5 in which the pivoted jaw has a lower surface parallel with the jaw slide means, and the clamping means engaging the lower surface of the pivoted jaw.

8. A top stop machine as in claim 4 including tape cutting means spaced from the jaws and on the other side of the jaws from the anvil mounting means, means to adjust the position of the tape cutting means towards and away from the jaws, and means to operate the tape cutting means.

9. A top stop machine as in claim 8 in which the tape cutting means includes a bracket mounted on the frame, means to adjust the position of the bracket on the frame towards and away from the jaws, a fixed blade carried by the bracket, an elongated pivot carried by the frame, a blade slidably mounted on the bracket in cooperative position with the fixed blade, a blade lever connected with the slidable blade and secured to the elongated pivot, a main shaft rotatably mounted on the frame, an operating lever secured to the pivot shaft, and a cam secured on the main shaft and engaging the operating lever.

10. A top stop machine as in claim 4 including spring means propelling the pivoted jaw away from the fixed jaw, and in which the means to cut the wire includes a cutting edge carried by the pivoted jaw, and a fixed cutter forwardly of and below the cutting edge.

11. A top stop machine as in claim 4 in which the wire feed means includes a feed roll, a ratchet wheel connected with the feed roll, a pawl arm mounted for oscillation, a pawl carried by the pawl arm and engaging the ratchet wheel, means to oscillate the pawl arm including a push pin mounted to engage the pawl arm, an operating lever engaging the push pin, means to adjust the position of the push pin, and a cam secured to the main shaft and connected with the operating lever; a pressure roll, and means to press the pressure roll against the wire and the wire against the feed roll.

12. A top stop machine as in claim 4 including a main shaft mounted on the frame in which the anvil is carried by an anvil slide, a guide carried by the frame and mounting the anvil slide, and the anvil operating means includes an anvil slide lever pivotally mounted on the frame and connected with the anvil slide, a pivotally mounted extension, adjusting screws carried by the extension and engaging opposite sides of the slide lever, and a cam secured to the main shaft and connected with the extension.

13. A top stop machine for applying a top stop to a slide fastener comprising a frame, a main shaft rotatably mounted on the frame, jaw slide means, guide means slidably mounting the jaw slide means on the frame, a fixed jaw carried by the jaw slide means having a clamping face, a pivoted jaw pivotally mounted on the jaw slide means adjacent the fixed jaw and spaced therefrom and having a clamping face, the clamping faces being opposite each other and spaced apart a distance to receive a top stop therebetween, a wire groove in each clamping face, jaw operating means to move the jaw slide means and the jaws forwardly and rearwardly including a cam mounted on the main shaft, clamping means to pivot the pivoted jaw at the end of its forward movement towards and away from the fixed jaw including a cam mounted on the main shaft, a wire feed means to feed wire to the jaws including a cam mounted on the main shaft, means to cut the wire at the jaws, an anvil adjacent the end of the pivoted jaw and receivable between the spaced jaws to bend the wire upon forward movement of the jaws, means mounting the anvil for lateral movement from between the jaws, and operating means connected with the anvil to move the same laterally from between the jaws after initial movement of the latter including a cam mounted on the main shaft and thereafter to return the anvil to initial position.

14. A top stop machine as in claim 13 including tape cutting means mounted on the frame adjacent to the jaws and on the other side of the jaws with respect to the anvil mounting means including a movable blade, a bracket adjustably secured to the frame and mounting the tape cutting means for movement towards and away from the jaws, and means to operate the movable blade including a cam mounted on the main shaft.

15. A top stop machine as in claim 13 in which the cam for the jaw operating means has an intermediate land for holding the jaws stationary during withdrawal of the anvil, and a second land to hold the jaws stationary during clamping movement of the pivoted jaw.

16. A top stop machine for applying a top stop to a slide fastener comprising a frame, jaw slide means, guide means slidably mounting the jaw slide means on the frame, a fixed jaw carried by the jaw slide means having a clamping face, a pivoted jaw pivotally mounted on the jaw slide adjacent the fixed jaw and spaced therefrom and having a clamping face, the clamping faces being opposite each other and spaced apart a distance to receive a top stop therebetween, a wire groove in each clamping face, jaw operating means to move the jaw slide means and the jaws forwardly and dwell in a mid position and then move forwardly and rearwardly, means to pivot the pivoted jaw at the end of the forward movement of the jaws towards and away from the fixed jaw, a wire feed means to feed wire to the jaws, means to cut the wire at the jaws, an anvil adjacent the end of the pivoted jaw and receivable between the spaced jaws to bend the wire upon forward movement of the jaws, means positioned on one side of the jaws and mounting the anvil for lateral movement from between the jaws, and operating means connected with the anvil to move the same laterally from between the jaws at the dwell in mid position and thereafter to return the anvil to initial position.

References Cited in the file of this patent

UNITED STATES PATENTS

| | | | |
|---|---|---|---|
| 526,080 | Lefeber | Sept. 18, | 1894 |
| 707,787 | Marresford | Aug. 26, | 1902 |
| 1,999,923 | Binch | Apr. 30, | 1935 |
| 2,169,802 | Keller | Aug. 15, | 1939 |
| 2,222,220 | Binch | Nov. 19, | 1940 |
| 2,253,322 | Bower | Aug. 19, | 1941 |
| 2,291,650 | Robinson | Aug. 4, | 1942 |
| 2,617,098 | Lenart | Nov. 11, | 1952 |
| 2,619,148 | Camp | Nov. 25, | 1952 |
| 2,701,877 | Morin | Feb. 15, | 1955 |
| 2,804,622 | Winberg | Sept. 3, | 1957 |
| 2,819,467 | Marks | Jan. 14, | 1958 |
| 2,858,537 | Coates | Nov. 4, | 1958 |